US008457617B2

(12) United States Patent
Sweeney et al.

(10) Patent No.: US 8,457,617 B2
(45) Date of Patent: Jun. 4, 2013

(54) SYSTEM AND METHOD FOR A WIRELESS DEVICE LOCATOR

(75) Inventors: Jeffrey M. Sweeney, Olathe, KS (US); Michael C. Robinson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1051 days.

(21) Appl. No.: 11/897,333

(22) Filed: Aug. 30, 2007

(65) Prior Publication Data

US 2009/0058670 A1 Mar. 5, 2009

(51) Int. Cl.
*H04M 3/00* (2006.01)

(52) U.S. Cl.
USPC ..... 455/418; 455/421; 455/456.1; 455/456.2; 455/457; 455/550.1

(58) Field of Classification Search
USPC .......... 455/456.1–456.2, 550.1, 67.11, 67.14, 455/67.7; 367/2, 6
See application file for complete search history.

(56) References Cited

U.S. PATENT DOCUMENTS

| | | | | |
|---|---|---|---|---|
| 4,264,978 | A * | 4/1981 | Whidden | 455/67.12 |
| 5,809,142 | A * | 9/1998 | Hurta et al. | 705/68 |
| 5,895,471 | A | 4/1999 | King et al. | |
| 6,435,690 | B1 | 8/2002 | Till | |
| 6,885,848 | B2 * | 4/2005 | Lee | 455/41.2 |
| 6,954,659 | B2 | 10/2005 | Tushinsky et al. | |
| 7,130,664 | B1 | 10/2006 | Williams | |
| 7,623,030 | B1 | 11/2009 | Popescu | |
| 2004/0178908 | A1 * | 9/2004 | Sari et al. | 340/539.32 |
| 2004/0209654 | A1 | 10/2004 | Cheung et al. | |
| 2004/0224670 | A1 | 11/2004 | Hull et al. | |
| 2005/0172154 | A1 | 8/2005 | Short et al. | |
| 2005/0221792 | A1 | 10/2005 | Mattisson | |
| 2005/0266891 | A1 | 12/2005 | Mullen | |
| 2006/0003700 | A1 | 1/2006 | Yasuda | |
| 2006/0293063 | A1 * | 12/2006 | Corrion | 455/456.1 |
| 2008/0013601 | A1 * | 1/2008 | Lind et al. | 375/140 |
| 2008/0125040 | A1 * | 5/2008 | Kalayjian | 455/41.2 |
| 2008/0125042 | A1 * | 5/2008 | Kim | 455/41.2 |
| 2008/0186960 | A1 | 8/2008 | Kocheisen et al. | |
| 2009/0325599 | A1 * | 12/2009 | Vuori | 455/456.1 |

FOREIGN PATENT DOCUMENTS

WO WO 2004100580 A1 * 11/2004

OTHER PUBLICATIONS

Non-Final Office Action date mailed Jan. 22, 2010 for U.S. Appl. No. 11/807,626.
Response filed Feb. 1, 2010 for U.S. Appl. No. 11/807,626.
Final Office action date mailed Apr. 23, 2010 for U.S. Appl. No. 11/807,626.
Response filed Jul. 6, 2010 for U.S. Appl. No. 11/807,626.
Notice of Allowance date mailed Jul. 19, 2010 for U.S. Appl. No. 11/807,626.
RCE filed Aug. 9, 2010 for U.S. Appl. No. 11/807,626.
Non-Final Office Action date mailed Apr. 22, 2010 for U.S. Appl. No. 11/906,100.
Response filed Jul. 7, 2010 for U.S. Appl. No. 11/906,100.
Final Office Action date mailed Sep. 7, 2010 for U.S. Appl. No. 11/906,100.

* cited by examiner

*Primary Examiner* — Kathy Wang-Hurst
(74) *Attorney, Agent, or Firm* — Swanson & Bratschun, L.L.C.

(57) ABSTRACT

A system and method for locating a wireless accessory. User input to search for the wireless accessory is received. A determination is made whether a signal is received from the wireless accessory. Location information is displayed to a user in response to detecting the signal from the wireless accessory.

26 Claims, 6 Drawing Sheets

SYSTEM AND METHOD FOR A WIRELESS DEVICE LOCATOR

BACKGROUND

The use of wireless devices has grown nearly exponentially in recent years. The growth is fueled by improved technologies and wireless communication protocols. Despite the advancement in technology, some communication problems still remain and other new problems have been created.

In many cases, wireless devices, such as cell phones, personal digital assistants (PDA), and Blackberry® devices may be used in conjunction with wireless accessories. These wireless accessories may include wireless earpieces, keyboards, cameras, a mouse, microphones, speakers, and other similar input/output accessories or wireless peripherals. These wireless accessories may be very expensive and, in many cases, are very small. As a result, the wireless accessory is frequently worn, clipped to clothing, stowed in a pocket, backpack, purse, luggage, or other bags, or personal belonging carriers. In other situations, the clothing or accessories of the wireless user may not accommodate carrying the wireless accessory on a clip or in a pocket.

Consequently, many times wireless accessories are lost or misplaced. Misplaced wireless accessories may be difficult to find because of size, specialized functionality, and battery duration. As a result, many users may not purchase wireless accessories because they are easily lost or misplaced and may be expensive to replace.

SUMMARY

One embodiment includes a system and method for locating a wireless accessory. User input to search for the wireless accessory may be received. A determination may be made whether a signal is received from the wireless accessory. Location information may be displayed to a user in response to detecting the signal from the wireless accessory.

Another embodiment includes a wireless device configured to locate a wireless accessory. The wireless device may include location logic configured to receive user input to search for the wireless accessory, determine whether a signal is received from the wireless accessory, and display location information to a user in response to detecting the signal from the wireless accessory. The wireless device may further include a transceiver configured to transmit the signal to the wireless accessory and receive location information from the wireless device.

Yet another embodiment includes a wireless device locator. The wireless device locator may include a processor for executing a set of instructions. The wireless device may further include a memory for storing the set of instructions which may include a location application for locating a wireless accessory. The location application may receive user input to search for a signal of the wireless accessory, detect the signal from the wireless accessory, and display location information to a user in response to detecting the signal from the wireless accessory.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for locating wireless accessories. The wireless accessories may be configured to go into a deep-sleep mode when inactive which may include becoming lost, misplaced, or stolen. A location application may be activated on a wireless device to search, scan, or send a signal to the wireless accessory until a signal or link is established between the two devices. The wireless accessory may be located using a wireless communications device or a wireless location device that may be used for location of wireless devices and accessories only, such as a key fob.

Figure 1:
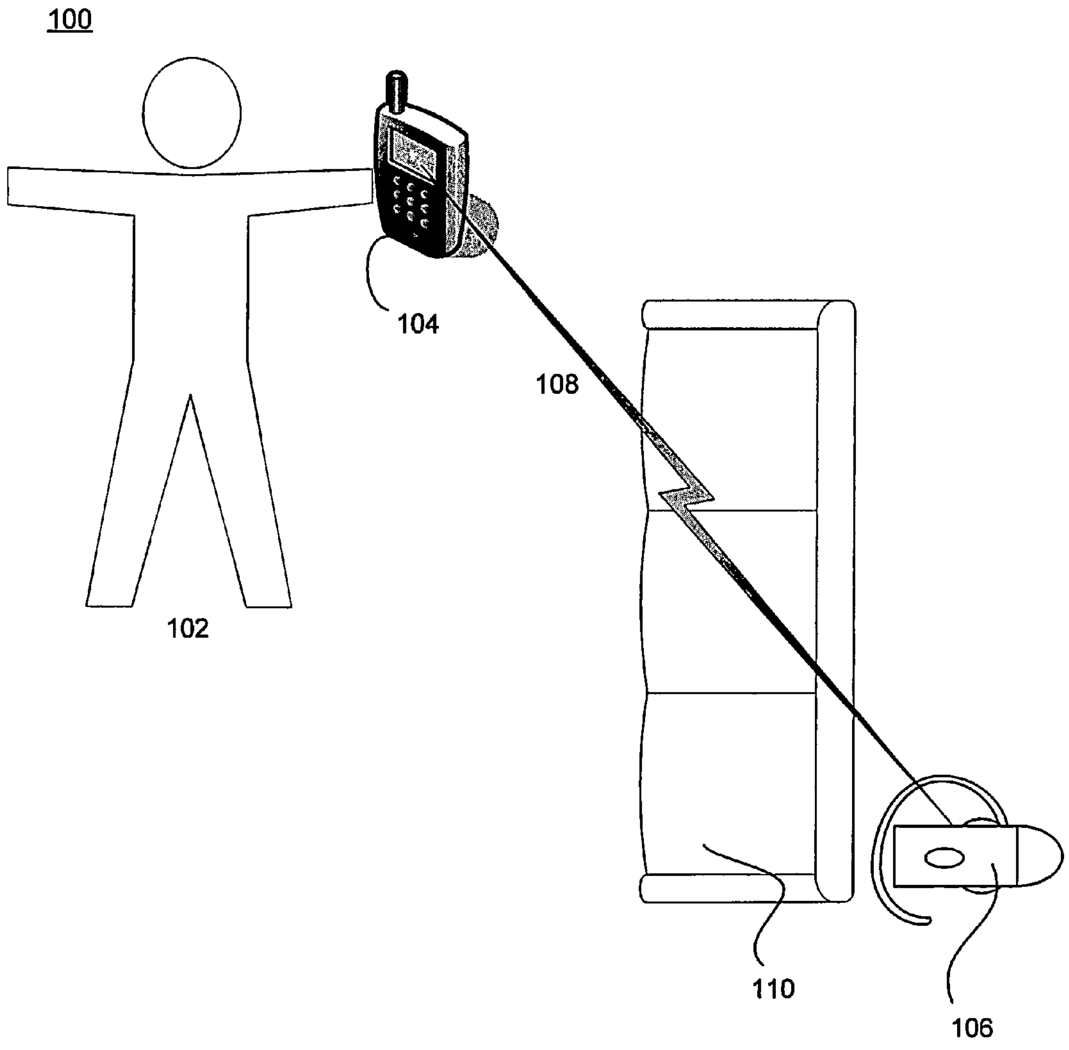
FIG. 1 is a pictorial representation of a wireless environment in accordance with an illustrative embodiment.

FIG. 1 is a pictorial representation of a wireless environment in accordance with an illustrative embodiment. FIG. 1 describes one embodiment of a wireless environment 100. The wireless environment 100 may include a wireless user 102, a wireless device 104, a wireless accessory 106, a wireless link 108, and an obstacle 110.

As technology improves, more and more wireless accessories are being developed for wireless devices. The wireless accessories, such as wireless accessory 106, enhance communication and allow the user to implement new features, functions, and methods of interfacing with the wireless device 104. In one embodiment, the wireless accessory 106 may be a hands-free earpiece, a keyboard, a speaker, a mouse, a microphone, or other accessory suitable for communication with the wireless device 104 through a wireless link 108. The wireless accessory 106 may also be a personal, household, or office item such as a remote control, medicine holder, cordless telephone, global positioning device, radio, mp3 player, video player, or calculator that enables communication through the wireless link 108.

In one embodiment, the wireless link 108 may be a Bluetooth® connection. However, the wireless link 108 may be a low-power radio signal or data communications link suitable for transmitting information or data between the wireless device 104 and the wireless accessory 106. The wireless link 108 enables the wireless device 104 and wireless accessory 106 to communicate in order to perform various features, functions, and commands as selected by the wireless user 102.

As the wireless user 102 becomes more dependent on the wireless accessory 106, the wireless user 102 may move the wireless accessory 106 from location to location. This use and corresponding movement increases the chance that the wireless accessory 106 will be lost, stolen, or otherwise misplaced by the wireless user 102. In many cases, it is only a matter of time before the wireless accessory 106 is misplaced.

In one common example, the wireless user 102 may drop or misplace the wireless accessory near an object 110. The object 110 may be an article of furniture, clothing, paper, a carrier, a vehicle or other object frequently used by or located in near proximity to the wireless user 102. In one example, the wireless user 102 may have accidentally dropped the wireless accessory 106, which landed behind the obstacle 110. As a result, the wireless user 102 is unable to visually identify the location of the wireless accessory 106, despite being in close proximity to the wireless accessory 106.

In one embodiment, the wireless user 102 may be able to locate the wireless accessory 106 by enabling a location application on the wireless device 104. For example, the wireless user 102 may activate a locate function wherein the wireless device 104 commands the wireless accessory 106 to begin beeping once the two devices establish the wireless link 108. In another embodiment, the location application executed by the wireless device 104 may indicate an approximate location of the wireless device 104 from the wireless accessory 106 based on the signal strength of the wireless link 108. For example, the wireless device 104 may use audio, video, or text to communicate a message to the wireless user that "The wireless accessory is within thirty feet." The wireless user 102 may use the location information to more effectively search for the wireless accessory 106 based on that information.

In another embodiment, the wireless device 104 may suggest a search pattern for the wireless user 102 to use. The wireless device 104 may sample the strength of the wireless signal broadcast from the wireless accessory 106. For example, the wireless device 104 may sample the single strength every two seconds as the user searches for the wireless accessory 106.

The strength of the signal may be related to a distance between the wireless device 104 and the wireless accessory 106. The different measurements may be used to form a matrix, graph, or map based on the signals strengths. The signal measurements may be used to indicate a direction which may be displayed visually, audibly, or using tactile feedback. In one example, the wireless device 104 may display a graphical user interface (GUI) that provides the user instructions of how to systematically search for the wireless device 104 and provides feedback regarding distance and location if available. The direction information may also work in conjunction with global position hardware, software, and features of the wireless device 104. The movement of the wireless device 104 and wireless accessory 106 with relation to one another may provide distance and directional information. For example, as the user moves closer to the wireless accessory 106, the wireless device 104 may begin to vibrate faster and faster.

Similarly, in another embodiment, the wireless user 102 may enable the wireless device 104 to transmit a signal through the wireless link 108 commanding the wireless accessory 106 to emit an alert to the wireless user 102 indicating the location of the wireless accessory 106. By activating the wireless accessory 106 to emit an alert or provide location information to the wireless device 104, the wireless user 102 may be able to locate the wireless accessory 106 in the wireless environment 100. As a result, the wireless user 102 may be able to save time and money by quickly finding the wireless accessory 106. The wireless device 104 may activate the wireless accessory 106 to play an alarm until the wireless accessory 106 is located by the wireless user 102.

In another embodiment, the wireless device 104 may emit a pattern of audio signals indicating the distance from the wireless accessory 106. For example, as the wireless device 104 is moved by the wireless user 102 to a location closer to the wireless accessory 106, the wireless device 104 may began to beep at a faster frequency relative to the distance between the wireless device 104 and the wireless accessory 106. In other words, the closer the wireless device 104 is moved toward the wireless accessory 106, the faster the beeping becomes to facilitate the wireless user 102 in finding the wireless accessory 106. Alternatively, different tones or sounds may be used to indicate that the user should move forward, backward, or side to side relative to the wireless accessory 106. The different tones, sounds, or verbal cues may also indicate directions, such as right, left, forward, back, North, South, East, or West.

In one embodiment, the wireless link 210 may be established between multiple wireless devices so that the wireless device 104 may be used to find a secondary wireless device 104. The wireless user 102 may be required to enter an identifier or other information in order to specifically search for the wireless accessory 106 or another wireless device. In one example, the wireless user 102 may be able to search for wireless accessories and devices to which the wireless device 104 had previously connected. In another example, the wireless user 102 may specify a name, identifier, or other information for searching, scanning, or sending a signal to the wireless accessory 106. The wireless device 104 may also search broadly for any wireless device in a deep-sleep mode.

Figure 2:
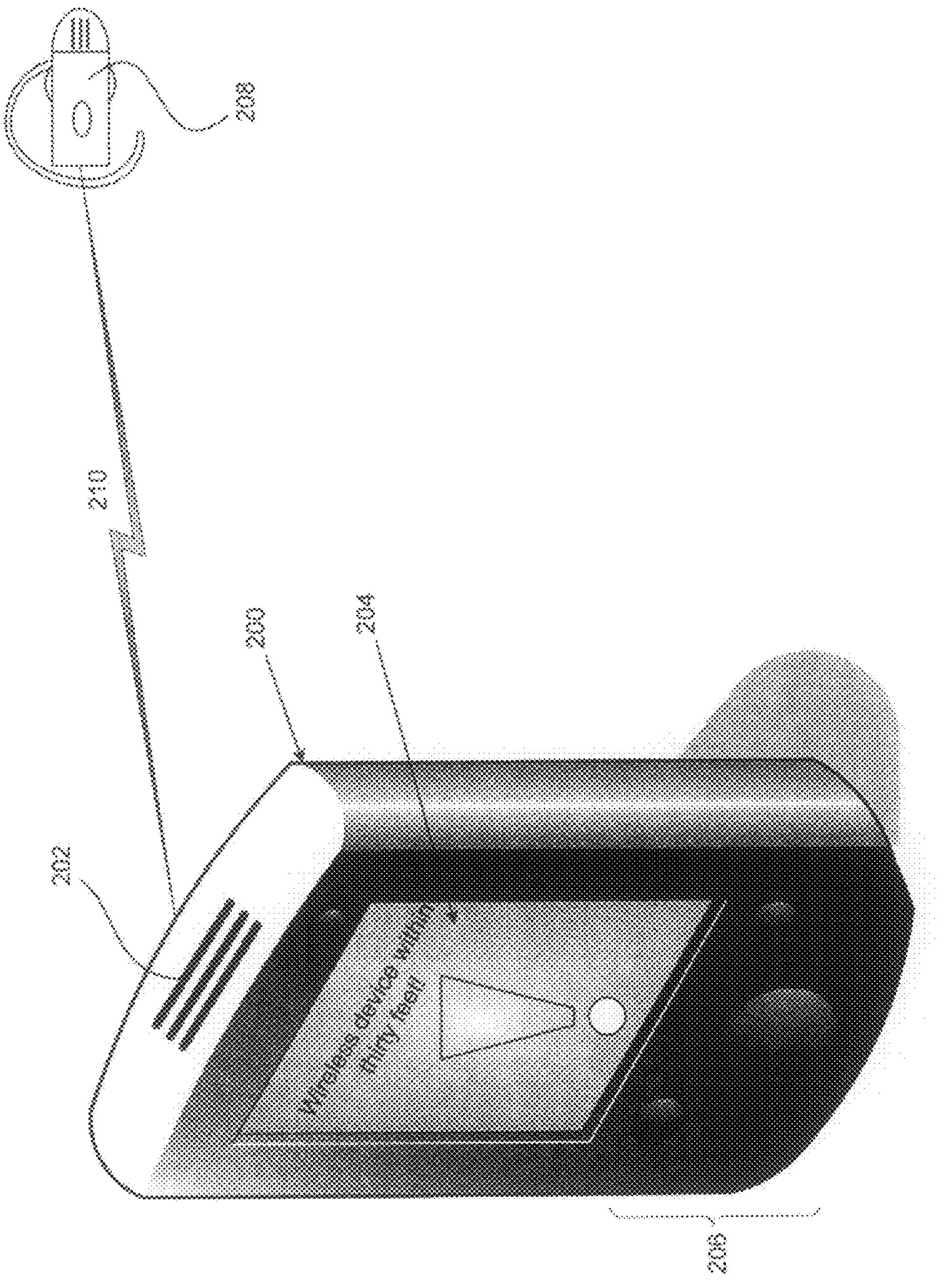
FIG. 2 is a pictorial representation of a wireless device and wireless accessory in accordance with an illustrative embodiment.

FIG. 2 is a pictorial representation of a wireless device and wireless accessory in accordance with an illustrative embodiment. FIG. 2 illustrates a wireless device 200, a speaker 202, a display 204, a user interface 206, a wireless accessory 208 and a wireless link 210. The wireless device 200 and the wireless accessory 208 may be particular implementations of the wireless device 104 and wireless accessory 106 of FIG. 1.

In one embodiment, a user may use the wireless device 200 to locate the wireless accessory 208. The wireless device 200 includes the speaker 202, the display 204, and the user interface 206 in order to receive user input and display information alerts and other indicators to the user. The speaker 202 may be used to play a message, or alert or alarm the user indicating the wireless link 210 has been established with the wireless accessory 208, or that one or more signals was received from the wireless accessory 208. For example, even if the wireless device 200 receives a single signal, ping, data packet, or other information from the wireless accessory because of a nearly depleted battery, the wireless device 200 may alert the user so that the user may begin an extensive manual or device facilitated search.

The display 204 may be used to display text, a GUI, or other visual information to the user. In one embodiment, the display 204 may indicate that a location application has been enabled by the user. Once the wireless link 210 is established between the wireless device 200 and the wireless accessory 208, the display may show a message indicating that the wireless accessory 208 is within a specified range or signal threshold of the wireless device 200. In one embodiment, a directional antenna or direction detection device of the wireless device 200 may use the display 204 to specify an approximate direction to the wireless accessory 208. In another embodiment, a specific location antenna or device may be attached to or communicate with the wireless device 200 for searching for and finding the wireless accessory.

The display 204 may display a GUI for providing user input and location information. The location information may include an indication that a signal is being received, the name of the wireless accessory 208, last registered connection to the wireless accessory 208, approximate distance to the wireless accessory 208, and approximate direction to the wireless accessory 208. The GUI may display an arrow, compass, or other directional indicator suitable for guiding the wireless user to the approximate location of the wireless accessory. The graphical user interface may also display textual indicators indicating an estimated or determined distance and location to the wireless accessory 208, as well as advice, suggestions, guidelines, or other information for guiding the user to the wireless accessory 208.

In one embodiment, the display 204 may be an interactive display element. However, the display 204 may be a liquid crystal display (LCD), touch screen, or other display element suitable for visually displaying information to the user and/or receiving user input. The user interface 206 may include buttons, scroll wheels, text pads, keyboards, or other commonly used wireless interface elements for receiving input from the user.

In other embodiments, the wireless device 200 may be a specialized device configured only to locate other wireless links, devices, or accessories as specified by the user. For example, the wireless device 200 may be a small wireless locator that may be attached to a key ring wherein the user may activate the device finder to locate the wireless accessory 208. In other embodiments, the wireless accessory 208 may be another wireless device such as a cellular telephone, PDA, $mp^3$ player, or other electronic device.

In one embodiment, the user may have been required to link the wireless device 200 and the wireless accessory 208 one or more times to enable the wireless device 200 to search for or identify a signal or link from the wireless accessory 208 when the wireless accessory 208 is lost or misplaced. For example, family members may use a single wireless device, such as a cellular telephone, to locate one or more cellular telephones of other members of the family when misplaced.

In one embodiment, the wireless link 210 is a Bluetooth connection. The Bluetooth connection may be used by the wireless device 200 and the wireless accessory 208 because of the low power requirement for broadcasting and receiving data and/or information through the wireless link 210. However, the wireless link 210 may be any wireless standard or protocol suitable for communications between the wireless device 200 and the wireless accessory 208.

Figure 3:
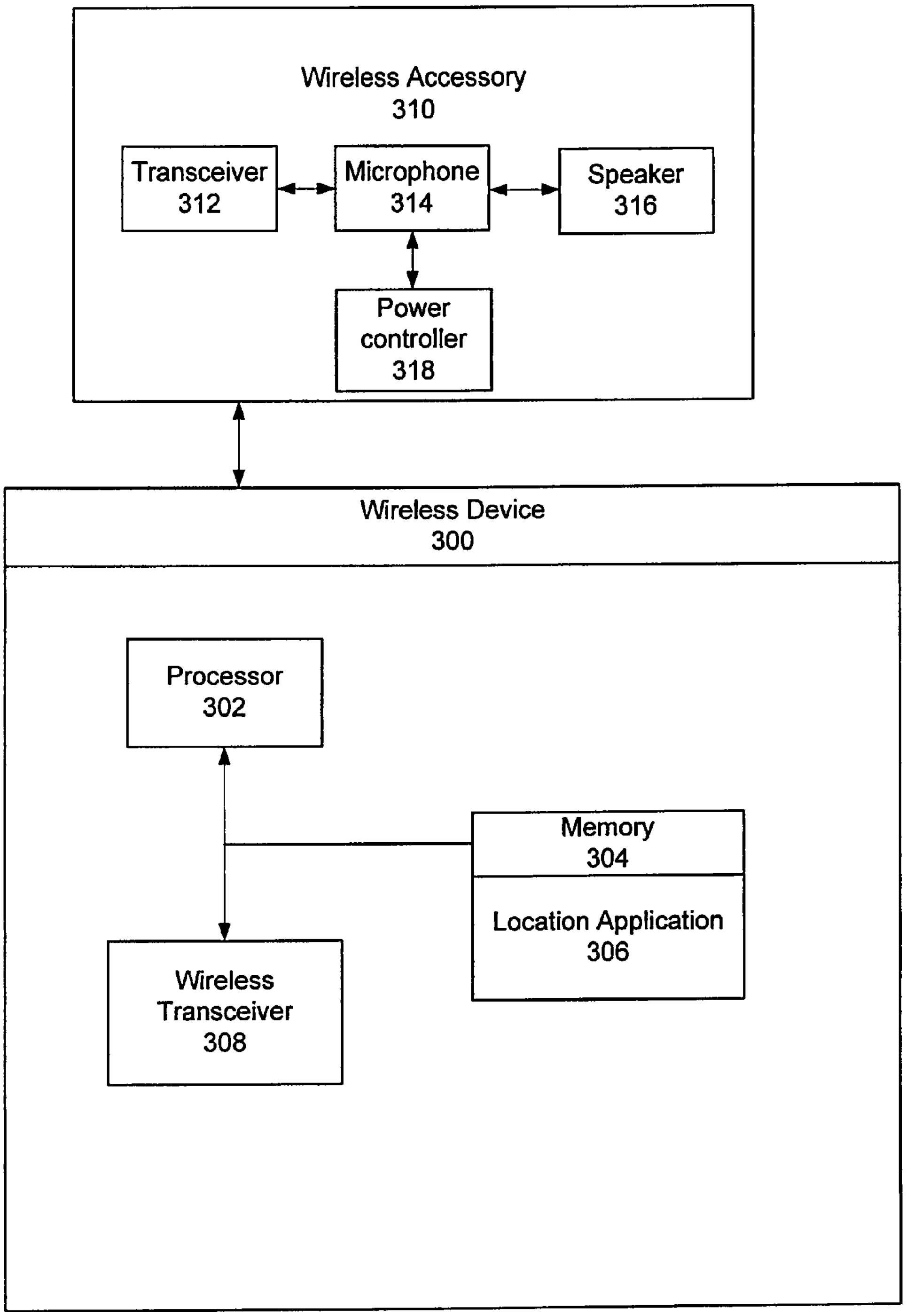
FIG. 3 is a block diagram of a wireless device and wireless accessory in accordance with an illustrative embodiment.

FIG. 3 is a block diagram of a wireless device and wireless accessory in accordance with an illustrative embodiment. FIG. 3 includes a wireless device 300 which may include a processor 302, a memory 304, a location application 306, and a wireless transceiver 308. The wireless accessory 310 may include a transceiver 312, a microphone 314, a speaker 316, and a power controller 318.

The wireless device 300 may be a combination of hardware and software elements which may use various structures, formats, and hardware/software combinations included in available wireless devices. The example shown in FIG. 3 is shown for illustration purposes only, and not as a limitation of required elements. The wireless device 300 may be accessed by a user to locate the wireless accessory 302.

The processor 302 may be a mobile processor, a computer processor, or other processing device or element used by the wireless device to process instructions, and otherwise perform data manipulation and processing, as required by the wireless device. The memory 308 may be a hard drive or flash memory for storing random access data or read-only data. However, the memory 308 may be any static or dynamic memory type or configuration suitable for storing and accessing electronic information and data.

The location application 306 may be a hard-wired circuit element, programmable circuitry, logic, a program, set of instructions, or application that is loaded into the memory 304 based on user input. The set of instructions may be executed by the processor 302 to perform the wireless location features and methods as herein described. Alternatively, the location application 306 may be run as a background application by the wireless device 300. As a result, the location application 306 may be used at any time to initiate a search for the wireless accessory 310 through a wireless link or wireless signal.

In particular, the location application 306 may coordinate the tools and resources available through the wireless device 300 to search for the wireless accessory 310. The wireless accessory 310 may store, log, or archive location information. For example, as the user searches for the wireless accessory 310 or receives an alert or indication that the wireless accessory 310 is in range of the wireless device 300, the location application 306 samples and stores signal strength readings. The numerous signal strength readings may be converted to a map, directional guide, text, or other visual indicators for guiding the user to the wireless accessory 310. The location application 306 may also coordinate the output of audio and tactile indicators to the user. For example, if the location application 306 receives an indication from the wireless transceiver 308 that a signal has been received from the wireless accessory 310, the location application 306 may ensure that the wireless device vibrates or plays an alert until responded to by the user.

In one embodiment, the wireless device 300 may include GPS hardware and software. The location application 306 may mark a location whenever the wireless device 300 loses contact with the wireless device 300. As a result, the user may be able to determine an approximate location associated with an event in which the Bluetooth connection between the wireless device 300 and the wireless accessory 310 was severed. GPS information, such as latitude and longitude, may also be linked with signal strength information received by the wireless device 300 from the wireless accessory 310 to provide distance and directional information and instructions for the user to locate the wireless accessory 310. The location application 306 may also display locations or areas the user has already searched or traveled within to find the wireless accessory 310.

The location application 306 may display an arrow, map, or text for helping the user find the wireless accessory 310. The location application 306 may use a proximity loop to receive, store, and analyze signals and information about the potential location of the wireless accessory 310. The proximity loop may be part of a recursive or looped program or logic that provides the user information regarding distance and direction to the wireless accessory 310. The location application 306 may also store historic information, such as visited locations and wireless accessories used by the wireless device 300.

The wireless accessory 310 may include the transceiver 312 for sending and receiving data and information with the wireless device 300. As previously described, the transceiver 312 may use Bluetooth to communicate with the wireless device 300. The wireless accessory 310 may enter a deep-sleep mode during which the wireless accessory 310 may periodically send a signal or location information intended for receipt by the wireless device 300. The deep-sleep mode may specify the frequency used by the wireless accessory 310 to search for or broadcast a signal to the wireless device 300. The transceiver 312 may also broadcast a location signal at specified times or based on user preferences.

The speaker 316 may be used to output an alert, alarm, or message to a user to indicate a location of the wireless accessory 310. In one embodiment, the location application 306 may be enabled wherein once the wireless accessory 310 and the wireless device 300 begin communication through their respective transceivers, 308 and 312. The speaker 316 of the wireless accessory 310 may play a selected alert to enable the user to find the wireless accessory 310.

The wireless accessory 310 may also include the power controller 318 for ensuring that the wireless accessory 310 may be located even in the event that it is lost. The problem with most wireless accessories is that once the wireless accessory 310 becomes lost, the battery is quickly drained within one or two days, preventing the user from finding the wireless device. In addition, some wireless accessories may experience damage or memory failure in the event that the battery is extensively discharged.

In one embodiment, the wireless accessory 310 uses the power controller 318 to place the wireless accessory 310 in a deep-sleep mode once the battery reaches a threshold level or reserve power level. For example, the power controller 318 may place the wireless accessory 310 in a deep-sleep mode once the wireless accessory 310 has not been used for eight hours or the battery level reaches twenty percent of capacity. In another embodiment, the user may specify an emergency or location battery level reserved for locating the wireless accessory in the event it is lost or misplaced.

The wireless accessory 310 may also include a back-up battery that is used only in the event the wireless accessory 310 is lost or the regular battery is completely drained. For example, the wireless accessory 310 may determine it is lost for entering a deep-sleep mode based on usage information, trends and user patterns, such as date, weekly usage information, and time of day. The wireless accessory 310 may sleep until activated by the wireless device 300 through the wireless link or a wireless control signal.

In another embodiment, during the deep-sleep mode, the wireless accessory 310 may periodically search for the wireless device 300. During the deep-sleep mode, the wireless accessory 310 may search for the wireless device 300 even less frequently than during normal usage and normal connection to the wireless device 300.

In one embodiment, the power controller 318 may control how often the transceiver 312 searches for the wireless link with the wireless device 300. For example, as the battery level decreases, the frequency at which the transceiver 312 searches for a wireless signal from the wireless device 300 decreases significantly in order to preserve battery life. The power controller 318, and its associated deep-sleep mode, may allow the wireless accessory 310 to be found even days after the wireless accessory 310 has been misplaced.

Figure 4:
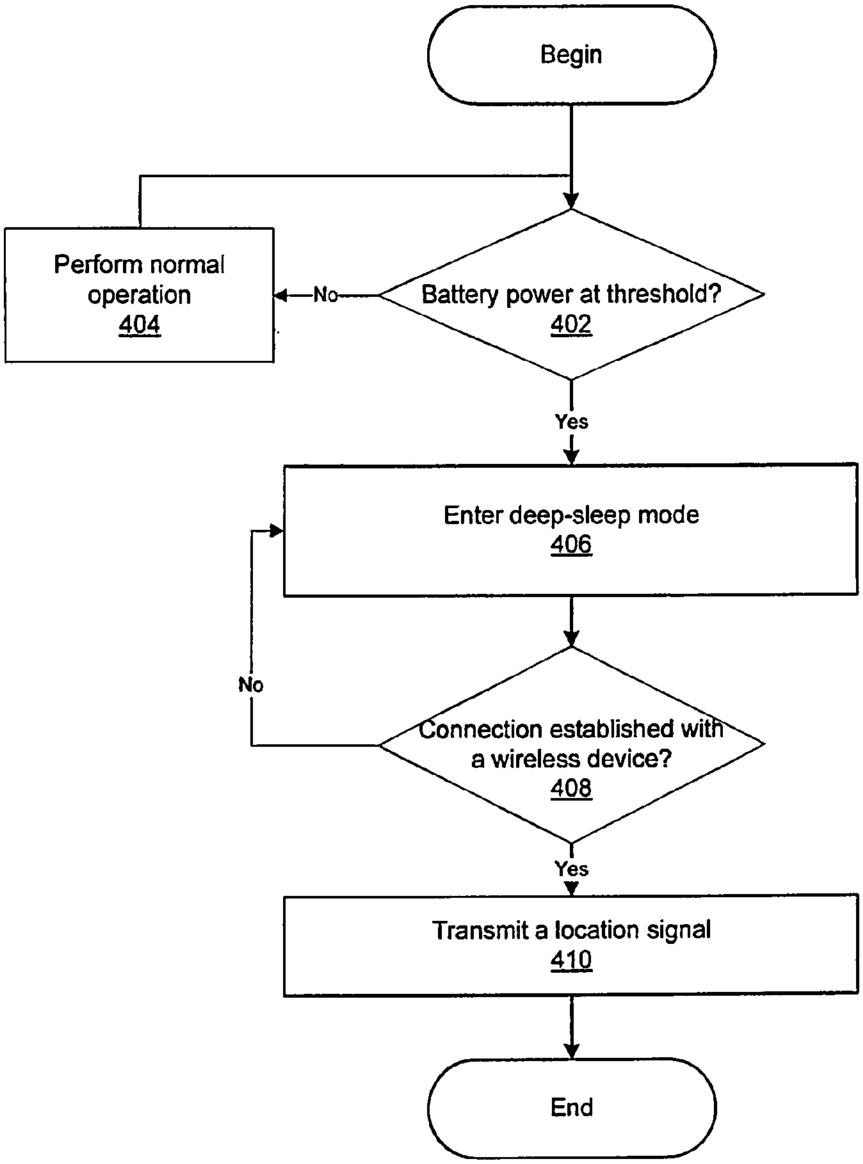
FIG. 4 is a flowchart of a process for locating a wireless accessory in accordance with an illustrative embodiment.

FIG. 4 is a flowchart of a process for locating a wireless accessory in accordance with an illustrative embodiment. The process of FIG. 4 may be implemented by a wireless accessory or wireless device. The process begins by the device determining whether the battery power is at a threshold (step 402) based on the power, charge, or energy level of the battery of the wireless device or accessory. The threshold of step 402 may be determined based on user input, manufacturer specification, or other guidelines or policies. In one example, the battery power threshold may be set to twenty percent of capacity for the wireless accessory.

If the battery power is not at the threshold, the wireless accessory performs normal operation (step 404). The normal operations may be the functions and purpose for which the wireless accessories are typically used or intended. For example, the wireless accessory may be a Bluetooth hands-free earpiece that enables a wireless user to speak and hear verbal communications through a wireless communications device without holding the handset to the user's head or using the speaker of the wireless communications device. In another example, the wireless accessory may be a wireless keyboard that allows the user to more easily and accurately enter data and information for use with a wireless device.

If the wireless accessory determines the battery power is at the threshold in step 402, the wireless accessory enters a deep-sleep mode (step 406) during which the deep-sleep mode of step 406, the wireless accessory periodically searches or attempts to receive a wireless link or signal from a wireless device. In all other respects, the wireless accessory conserves battery power through inactivity and disabling features of the wireless accessory. The deep-sleep mode ensures that if the wireless link or wireless signal is received by the wireless accessory, an alarm, alert, or wireless connection may still be established for a short period of time before the wireless accessory's battery is completely drained.

Next, the wireless accessory determines whether a connection is established with a wireless device (step 408). If the wireless accessory determines that the connection has not been established, the device remains in deep-sleep mode (step 406) to ensure that battery power is conserved so the user may still locate the device in the future using the wireless location methods and systems herein described.

If the wireless accessory determines the connection was established, the wireless accessory transmits a location signal (step 410). During step 410, the wireless accessory may broadcast location information, or it may play an alert, alarm, or other indicator to the user indicating the location of the wireless accessory. The location information may specify an approximate distance or location to the wireless accessory to the extent that such information may be determined or transmitted to the wireless device. In one example, the wireless accessory may begin to beep until found or until a button of the device is pressed or otherwise activated. During step 410, the wireless accessory may be temporarily activated by a signal received from the wireless device or wireless locator to play an alarm or alert and send location information to the wireless device.

Figure 5:
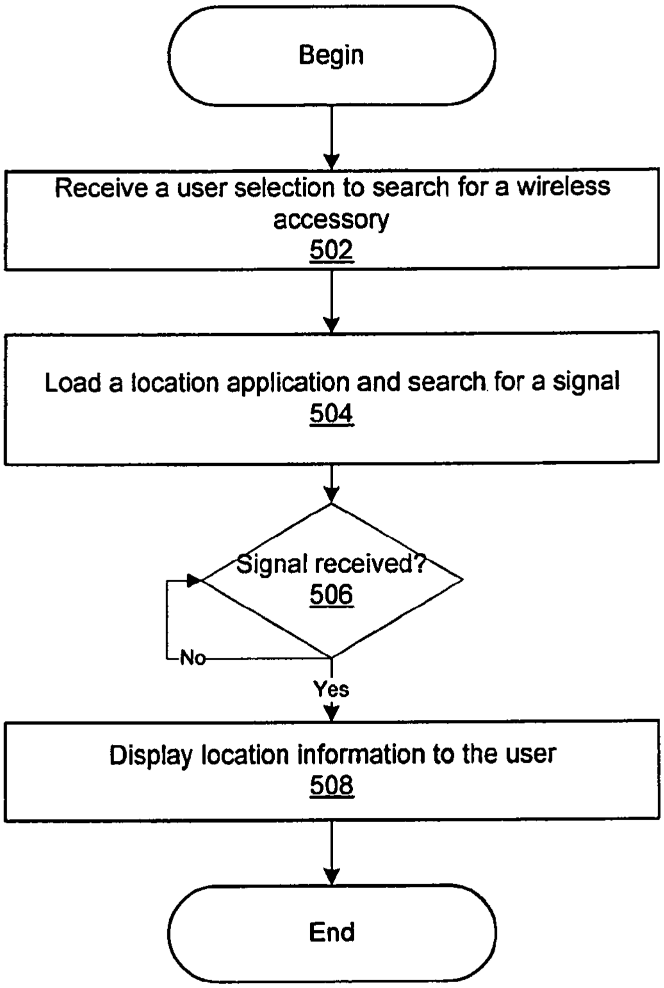
FIG. 5 is a flowchart of a process for searching for a wireless accessory in accordance with an illustrative embodiment.

FIG. 5 is a flowchart of a process for searching for a wireless accessory in accordance with an illustrative embodiment. The process of FIG. 5 may be implemented by a wireless device. The process may begin with the wireless device receiving a user selection to search for a wireless accessory (step 502). The user may enter the selection using a graphical user interface (GUI), interface, or program of the wireless device. In one example, a user may select a wireless accessory from a list or otherwise indicate that the user desires to find the wireless accessory. The user may specify a single wireless accessory or may search by using a password, key code, name, or other identifier.

The wireless device loads a location application and searches for a signal (step 504). By default, the wireless device may periodically search for the wireless accessory once a link has been established. The location application may be an application or logic. The wireless device may also be activated to actively search for the wireless accessory. For example, once a user has noticed that a wireless accessory is lost, the user may set the wireless device to scan for the wireless accessory and inform the user once the wireless device is in range of the wireless device. As a result, the user may go through a normal routine and receive an alarm if the wireless device is able to contact the wireless accessory. Next, the wireless device determines whether the signal is received (step 506). If the wireless device determines the signal is not received, the wireless device continues to search in step 506.

If the signal is received in step 506, the wireless device displays location information to the user (step 508). The location information may include an approximate distance to the wireless device determined and based on the signal strength received from the wireless accessory. In one embodiment, the wireless device displays approximate distance and location information. The location information displayed in step 508 may be constantly updated based on the movement of the user with the wireless device using proximity loop detection.

In one embodiment, the wireless device provides an arrow and estimated distance between the wireless device and the wireless accessory. The distance and direction may be determined using a proximity loop for gathering and analyzing the signals received from the wireless accessory. The location information may be provided using a combination of audio, visual, and tactile indicators. The location information may also include GPS information available through the wireless device. For example, the location information may suggest a search pattern to be traveled by the user or a last known location of the wireless accessory. The location information may also specify an identifier or a name for the wireless accessory located. In another embodiment, the location information may inform the user that the wireless device has commanded the wireless accessory to play an alert until it is found.

Figure 6:
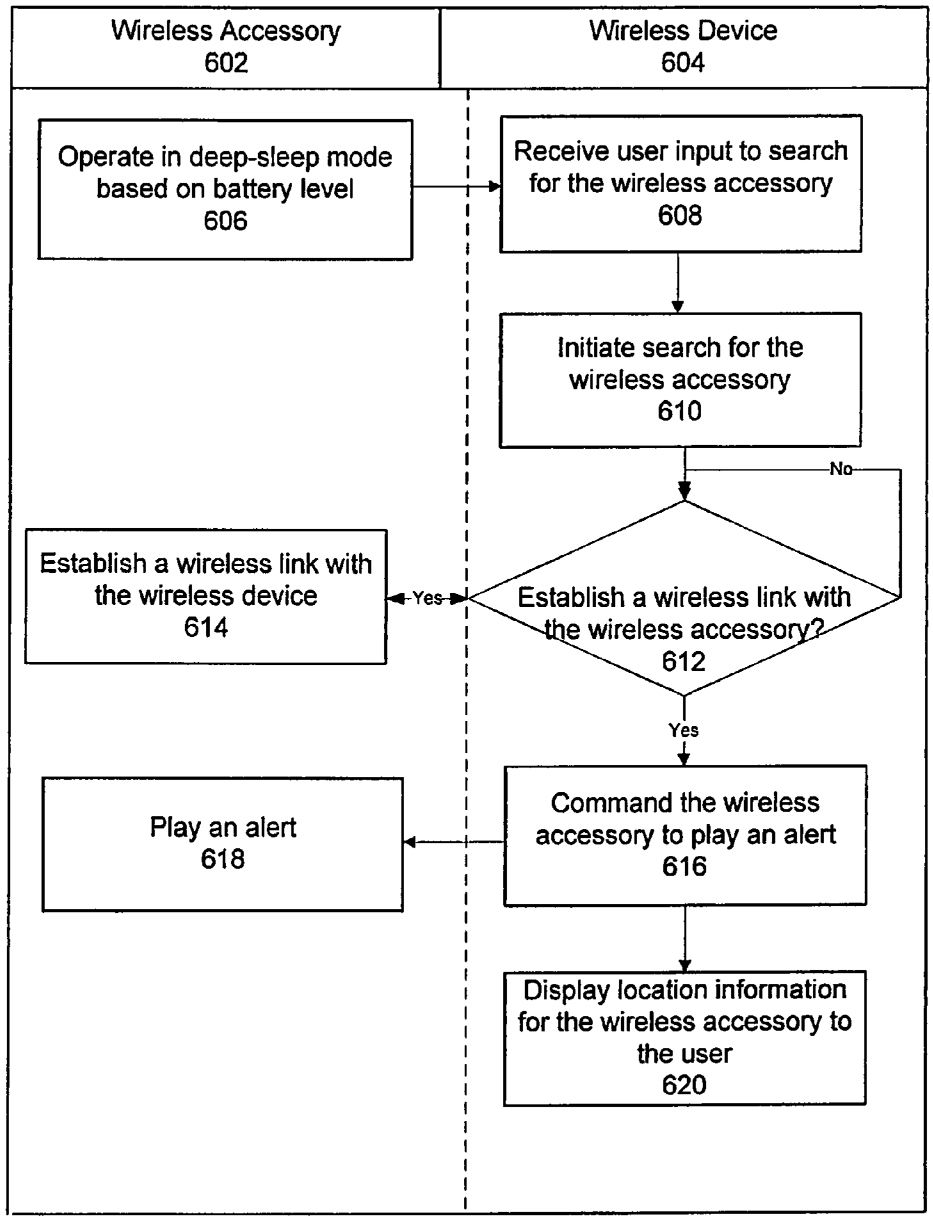
FIG. 6 is a flowchart of a process for locating a wireless accessory using a wireless device in accordance with an illustrative embodiment.

FIG. 6 is a flowchart of a process for locating a wireless accessory using a wireless device in accordance with an illustrative embodiment. The flow chart of FIG. 6 is another method for implementing the processes herein described for a wireless accessory 602 and a wireless device 604. The process may begin with the wireless accessory 602 operating in a deep-sleep mode based on a battery level (step 606).

Next, the wireless device 604 receives user input to search for the wireless accessory (step 608). Next, the wireless device 604 initiates a search for the wireless accessory (step 610). The search of step 610 may involve actively searching or scanning for a signal or link to the wireless accessory 602 by broadcasting a specified activation or alarm frequency, or by enhancing sensitivity of the transceiver to receive communications from the wireless accessory 602. Alternatively, the wireless device 604 may use any other methods to actively search for a signal or connection to the wireless accessory 602.

Next, the wireless device 604 determines whether a wireless link is established with the wireless accessory (step 612). If the wireless link is not established, the wireless device continues to search in step 612. The wireless link of step 612 may also be a single data packet or signal received from the wireless accessory.

If the wireless device determines a link is established with the wireless accessory in step 612, the wireless accessory 602 similarly establishes a wireless link with the wireless device (step 614), and the wireless device 604 commands the wireless accessory to play an alert (step 616). The wireless link established during step 614 may activate the wireless accessory 602 to enable an alarm or transmit location information to the wireless device 604 as requested by the wireless device 604. The alert or alarm of step 616 may be based on the battery power available to the wireless accessory 602. For example, if insufficient batter power is available, the wireless accessory 602 may broadcast a signal at an amplitude or power level available.

The wireless device 604 displays location information for the wireless accessory 602 to the user (step 620). In one embodiment, the wireless device 604 may use a directional antenna to point an approximate location, bearing, or heading to which the user should move in order to locate the wireless accessory 602. The GUI may be used to display distance and direction information to the user. The location information may be provided as a pop-up or screen on the alert of the user in order to notify the user that the wireless accessory 602 is within range regardless of how the wireless device 604 is being used or stored at the moment. As a result, the user may be able to find the wireless accessory 602 even when lost or misplaced in unsuspected locations.

The user may also specify preferences for receiving the location information. For example, the user may register a number of devices as critical and instruct the wireless device 604 to mark a time, date, and location that contact with the wireless accessory 602 is lost. The location information may be determined from a series of measurements of the signal strength of the wireless accessory 602 as the wireless device 604 is moved around. The different values for the signal strength may be analyzed using mathematics and signal propagation characteristics to determine distance and location from the wireless accessory 602. These values then become the location information displayed to the user. An approximate location of the wireless device 604 may be determined and recorded by a location application using triangulation or based on the cell, server, virtual locator record, or other device the wireless device 604 is communicating with when the link with the wireless accessory 602 was broken. Alternatively, the location information may be one or more alerts, auditory signals, or location information in the form of text or flashing lights that help guide the user to the wireless accessory 602 using the wireless device 604.

The previous detailed description is of a small number of embodiments for implementing the invention and is not intended to be limiting in scope. The following claims set forth a number of the embodiments of the invention disclosed with greater particularity.

What is claimed:

1. A method for locating a wireless accessory, the method comprising:
- receiving user input on a wireless device to search for the wireless accessory;
- determining whether a signal is received from the wireless accessory;
- determining a distance to the wireless accessory from the wireless device utilizing a signal strength from the wireless accessory in response to receiving the signal;
- recording a plurality of signal strength readings from the wireless accessory as the wireless device is moved;
- generating location information for the wireless accessory including the distance and a direction utilizing the plurality of signal strength readings;
- automatically displaying the distance to the wireless accessory and the location information to a user through the wireless device in response to generating the location information;
- suggesting to the user a search pattern to be traveled by the user to systematically search for the wireless accessory; and
- playing an audio signal by the wireless device at an increasing frequency as the signal strength increases based on increased proximity between the wireless devices and the wireless accessory.

2. The method according to claim 1, wherein the user input specifies to search only for the wireless accessory from among a plurality of wireless accessories accessible by the wireless device.

3. The method according to claim 2, wherein the user input includes an identifier for the wireless accessory.

4. The method according to claim 1, wherein the signal is a low-power data link between the wireless accessory and a wireless device locator.

5. The method according to claim 1, wherein the low-power data link is a Bluetooth connection.

6. The method according to claim 1, further comprising:

sampling the signal strength at intervals to determine the location information, the location information includes the distance and approximate direction to the wireless accessory from the wireless device, the location information being displayed by a graphical user interface of the wireless device.

7. The method according to claim 1, wherein the signal is an activation signal that enables the wireless accessory to communicate with the wireless device.

8. The method according to claim 1, wherein determining further comprises:

detecting the signal from the wireless accessory.

9. The method according to claim 1, wherein the location information specifies the distance between the wireless device and the wireless accessory.

10. The method according to claim 1, further comprising:

commanding the wireless accessory and the wireless device to play an alarm in response to receiving the signal from the wireless accessory.

11. The method according to claim 1, wherein the wireless accessory wakes from a deep-sleep mode to transmit the signal at a decreasing frequency associated with battery life of the wireless accessory.

12. The method according to claim 1, wherein the wireless accessory is a secondary wireless device that was previously identified by the wireless device based on communications or user input.

13. A wireless device configured to locate a wireless accessory, the wireless device comprising:

location logic configured to receive user input to search for the wireless accessory, determine whether a signal is received from the wireless accessory, record a plurality of signal strength readings from the wireless accessory as the wireless device is moved, determine location information identifying a distance and a direction to the wireless accessory utilizing the plurality of signal strength readings; and display the distance to the wireless accessory and the location information to a user in response to receiving the signal from the wireless accessory; and suggest to the user a search pattern to be traveled by the user to systematically search for the wireless accessory; and play an audio signal by the wireless device at an increasing frequency as the signal strength increases based on increased proximity between the wireless devices and the wireless accessory; and a transceiver configured to transmit and receive the signal from the wireless accessory.

14. The wireless device according to claim 13, wherein the wireless accessory is a secondary wireless device.

15. The wireless device according to claim 13, wherein the wireless accessory enters a deep-sleep mode when a power level reaches a threshold, and wherein the wireless accessory signal awakens from the deep-sleep mode to transmit the signal at a decreasing frequency associated with the power level of a battery of the wireless accessory.

16. The wireless device according to claim 15, wherein the wireless devices specifies the threshold at which the wireless accessory enters the deep-sleep mode, and wherein the wireless accessory plays an audio alarm in response to communicating the signal with the wireless device.

17. The wireless device according to claim 13, further comprising:

an interactive display for receiving the user input and displaying the location information to the user using a graphical user interface; and a speaker for providing an audio pattern for guiding a user to a location of the wireless accessory.

18. The wireless device according to claim 13, further comprising:

a direction antenna configured to allow a user to determine a direction of the wireless accessory.

19. The wireless device according to claim 13, further comprising:

global position system configured to determine a position, wherein the position is part of the location information.

20. The wireless device according to claim 13, wherein the global positioning system marks a last known location during which the wireless device was in communication with the wireless accessory.

21. A wireless device locator comprising:

a processor for executing a set of instructions;

a memory for storing the set of instructions, wherein the set of instructions includes a location application for locating a wireless accessory, the location application is executed by the processor to:

receive user input to search for a signal of the wireless accessory, detects the signal from the wireless accessory, record a plurality of signal strength readings from the wireless accessory as the wireless device is moved, determine an approximate distance and approximate direction to the wireless accessory from the wireless device as location information utilizing the plurality of signal strength readings; automatically display the distance and the location information to a user through a display in response to detecting the signal from the wireless accessory; and suggest to the user a search pattern to be traveled by the user to systematically search for the wireless accessory; and play an audio signal by the wireless device at an increasing frequency as the signal strength increases based on increased proximity between the wireless devices and the wireless accessory.

22. The wireless device locator according to claim 21, wherein the wireless device locator is a wireless communications device.

23. The wireless device locator according to claim 21, wherein the signal temporarily activates the wireless accessory to communicate with the wireless device and play an alarm for indicating a location of the wireless accessory to the user.

24. The wireless device locator according to claim 21, wherein the signal is a wireless link established between the wireless device locator and the wireless accessory.

25. The wireless device locator according to claim 21, wherein the location application includes a graphical user interface that displays the approximate distance and the approximate direction to the wireless device locator.

26. The wireless device locator according to claim 21, wherein the location application plays an alarm to the user in response to detecting the wireless accessory is within range of the wireless device.

* * * * *